May 4, 1948.　　W. W. P. STELTER　　2,440,835
FEED CONTROL FOR CORN SHREDDERS
Filed April 19, 1943　　2 Sheets-Sheet 1

Patented May 4, 1948

2,440,835

UNITED STATES PATENT OFFICE 2,440,835

FEED CONTROL FOR CORN SHREDDERS

Walter W. P. Stelter, Echo, Minn.

Application April 19, 1943, Serial No. 483,608

5 Claims. (Cl. 130—33)

This invention relates to corn huskers and shredders and more particularly to improved means for controlling the feeding of the crop to the working parts of the shredder.

In my prior Patent Number 2,202,540, issued May 28, 1940, there is disclosed a corn husker and shredder with improved feeding means for the crop as it is introduced to the snapping rollers.

One of the features disclosed in the above identified patent is a retarder drum which is adapted to prevent the crop from feeding to the snapping rollers too fast or in too great a quantity.

The present invention relates to means for regulating the feed of the crop on the crop conveyor so that as bundles of corn are fed into the machine the regulator will engage any portion of the crop lying a predetermined maximum distance above the conveyor and momentarily check its forward advance to permit shifting or spreading of the crop to a lower maximum level as it feeds forwardly on the conveyor. This action is adapted to take place before the crop is engaged by the primary retarding element disclosed in the above identified patent.

It is an object of the invention to provide simple and effective means for regulating the depth of the crop as it is being fed forward by the conveying means and also to provide means for holding the bundles of corn or similar material from being carried too far forwardly until the binding string has been severed by the band cutting means.

More specifically it is an object of my invention to provide a pair of stationary plates at opposite sides of the crop conveyor adjacent its discharge end to engage that portion of the crop which is too high or thick on the conveyor and keep it from progressing toward the snapping rollers until a thinner layer of crop approaches along the conveyor whereupon that portion of the crop which is held back will drop onto the thinner layer and feed into the machine.

The above and other objects and advantages of the invention will more fully appear from the following description made in connection with the accompanying drawings, wherein like reference characters refer to the same parts throughout the views, and in which.

Figure 1:
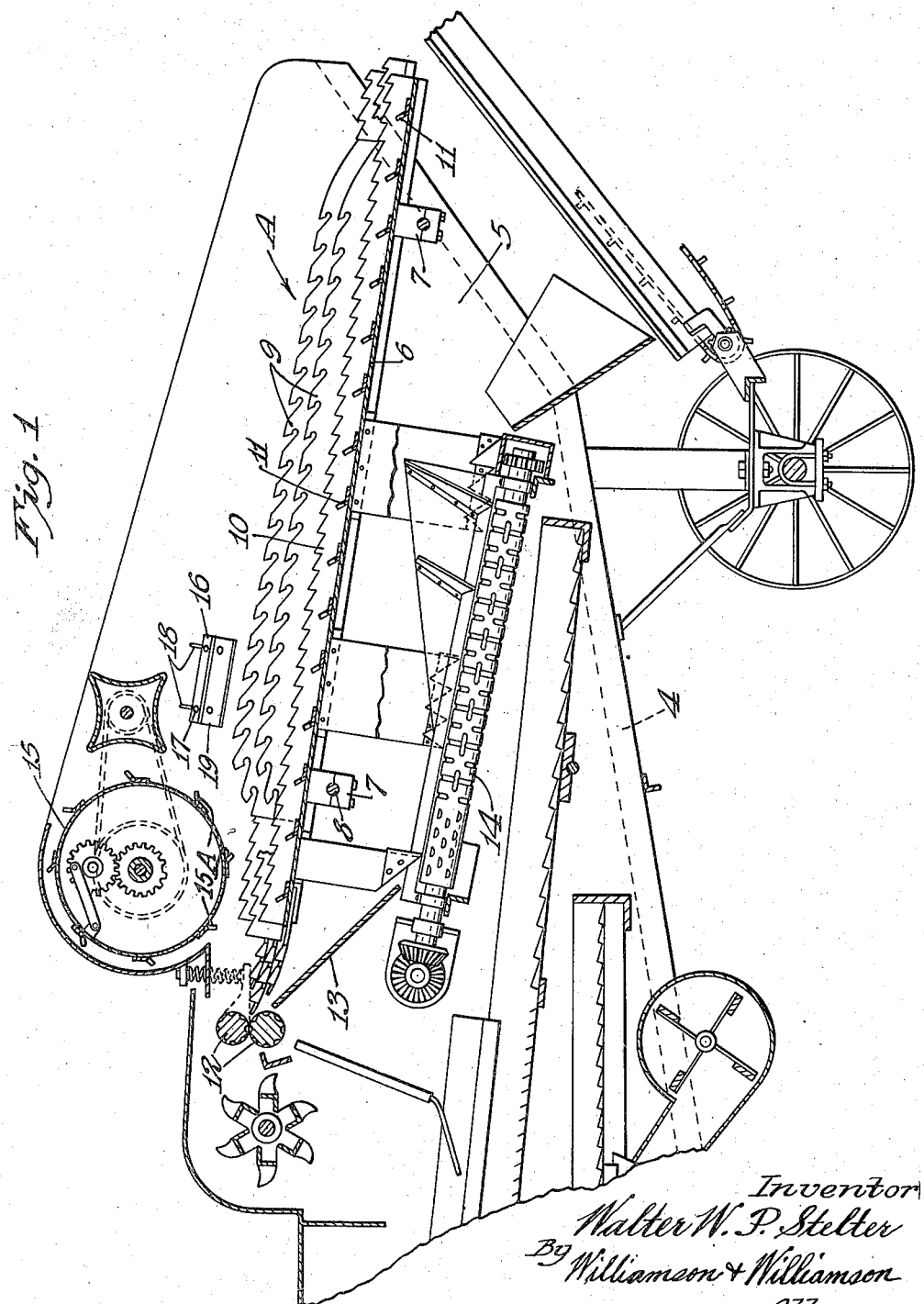
Fig. 1 is a longitudinal vertical section through a corn shredder with certain front and rear portions of the shredder broken away.

Inasmuch as the general structure of the machine shown in the drawings is described in the above identified patent only certain main parts thereof are described herein. It includes a frame 4 having sides 5. The crop conveyor A is made up of a plurality of feed decks 6 mounted on bearings 7. The bearings 7 are in turn mounted upon a crank shaft 8. Pairs of spaced toothed plates 9 extend upwardly from the feed decks 6 and, as shown in Fig. 2, the outer sides of the outer decks 6 are in the form of toothed plates 10 which are somewhat shorter than the plates 9. Toothed cleats 11 extend transversely of the feed decks 6 to assist in moving the crop forwardly. Rotation of the crank shaft 8 causes the feed deck 6 and the toothed plates 9 and 10 to move with a gyratory motion which provides for a step-by-step forward feeding of the crop which is to the left as viewed in Fig. 1. The conveyor A is adapted to feed the crop to a snapper unit comprising a pair of snapping rollers 12 as well as to break the bands which are used to tie the crop into bundles. When the snapping rollers 12 have snapped the ears from the stalks of corn said ears of corn are delivered down an inclined chute 13 to the husking rollers 14.

Figure 2:
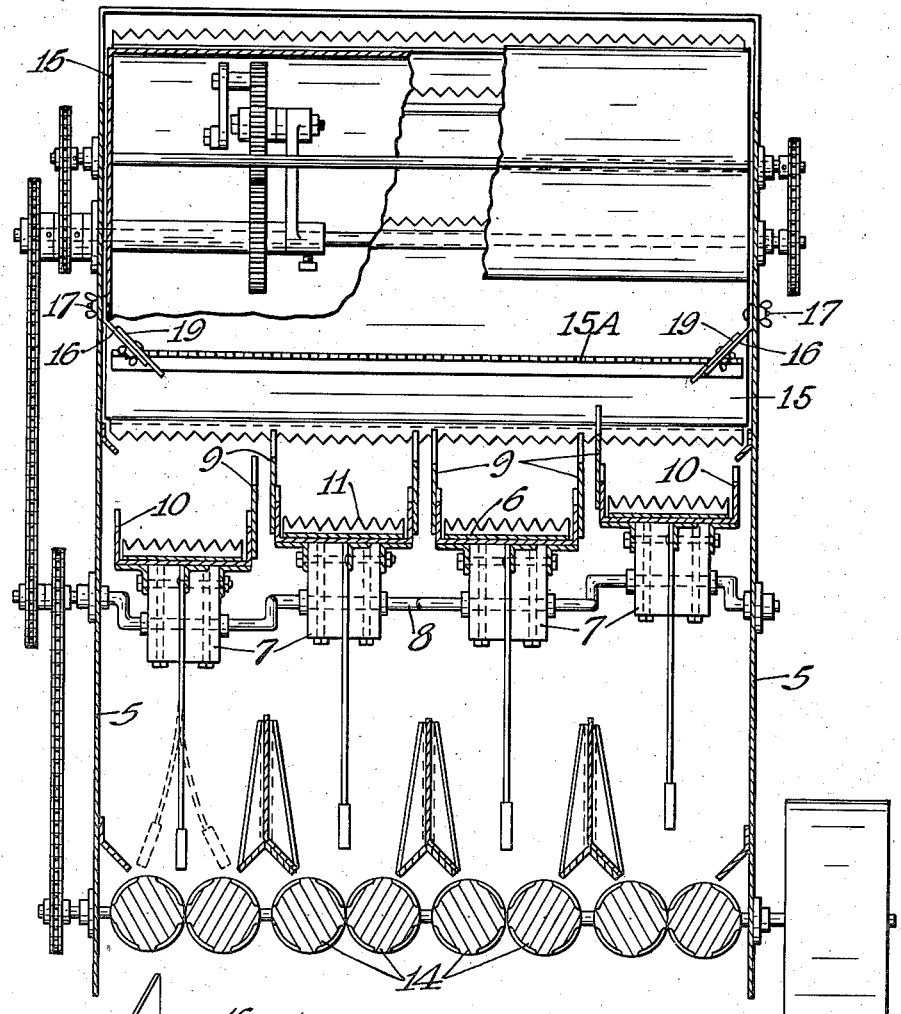
Fig. 2 is a transverse section through the shredder looking in the direction of initial feed of the crop.
Figure 3:
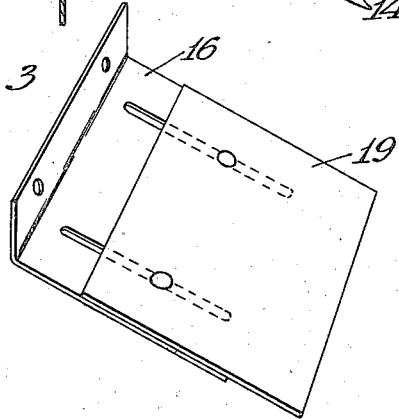
Fig. 3 is a perspective view of one of the crop feed control devices.

As best shown in Fig. 1 and as illustrated in the above identified patent, there is provided a retarder drum 15 having toothed cleats 15a which is adapted to rotate in a counterclockwise direction to keep the snapping rollers from becoming clogged with too great a supply of crop. However, while this device greatly improved the action of the machine the shredder sometimes becomes clogged when large bundles of corn reach the retarder drum 15 and snapping rollers 12. I, therefore, mounted a pair of plates 16 on the machine sides 5 by means of bolts 17 extending through vertically elongated slots 18. The plates 16, as shown in Figs. 2 and 3, are provided with adjustable extensions 19 and said plates are also shown to extend downwardly and inwardly at an angle toward the outermost feed decks 6. The spreader plates or members 16 are positioned at such a height above the feed decks 6 that if an unusually thick layer or an uncut bundle of corn is fed toward the snapping rollers 12 the upper stalks of the corn will encounter the spreader plates 16 and be held back while the stalks beneath the spreader plates 16 will feed forwardly in a normal manner. If a bundle has fed through and its binding has not been cut it will be held back by said plates 16 until the binding is cut and the bundle has been spread out. When the abnormally large bunch of stalks is passed and has been spread out that portion of the crop or that group of stalks which has been held by the spreader plates 16 will drop back onto the crop conveyor A or upon a thinner normal layer of crop being fed forwardly.

The illustrated embodiment of the invention contemplates the feeding of two bundles of corn lying side by side on the crop conveyor, the bundles being placed on the conveyor with the binding strings or bands unbroken and advanced by gyratory motion of the conveyor, the bundles being fed forwardly with the stalks moving lengthwise. The plates 16 will engage and check the advance of the bundles of corn until the binding strings or bands are broken whereupon the bundles will tend to fall apart or spread laterally on the conveyor. The stalks engaged by the plates 16 will be held in check and those that lie centrally of the conveyor between the plates will feed forward faster, permitting the stalks retarded by the plate 16 to then drop downwardly and feed along behind the more advanced stalks.

For smaller machines having, for instance, only three rows of gyratory conveyor elements the bundles of corn would be fed into the machine one behind the other in a single line and, of course, the retarder plates 16 would then be somewhat closer together so they would properly engage the upper portions of the bundles before the binder strings or bands are broken.

The spreader plates are extremely simple in construction and easily installed in a corn shredder and husker. Their function, however, is extremely beneficial and has greatly improved the operation of the machine. It has no moving parts and it is, therefore, not subject to wear and in addition it positively controls the thickness of the layer of corn stalks which is being fed forwardly toward the snapping rollers. By installing a spreader plate on each side of the machine the excess stalks are engaged and properly retained.

It will, of course, be understood that various changes may be made in the form, details, arrangement and proportions of the various parts without departing from the scope of my invention.

What is claimed is:

1. In a machine such as a corn shredder having snapping rollers between which material is to be fed, a crop conveyor adapted to receive the crop thereon and feed it to said rollers, and a crop spreader plate comprising an element mounted adjacent one side of said conveyor and spaced a considerable distance from the other side of the conveyor, said spreader plate slanting inwardly and downwardly toward said conveyor, and the lowest point on said crop spreader plate being disposed in upwardly spaced relation to said conveyor.

2. The structure defined in claim 1 and means for varying the location of said crop spreader plate vertically in respect to said conveyor.

3. In a machine such as a corn shredder having snapping rollers between which material is to be fed, a crop conveyor for feeding the crop to said rollers, a pair of side members extending above said conveyer laterally of the conveyor and a pair of crop spreader members located one at each side of the conveyer above the same and mounted on said side members to extend diagonally downwardly and inwardly therefrom, said crop spreader members being transversely spaced from each other so that there will be clearance between the crop spreader members over the central part of the conveyer to permit of the free movement of the central run of the crop carried by the conveyers without interference by said crop spreader members.

4. The structure defined in claim 3 and means for varying the extension of the lower portions of said spreader members from said sideboards.

5. The structure defined in claim 3, said crop spreader members comprising plates.

WALTER W. P. STELTER.

REFERENCES CITED

The following references are of record in the file of this patent:

UNITED STATES PATENTS

| Number | Name | Date |
| --- | --- | --- |
| 718,665 | Shedenhelm | Jan. 20, 1903 |
| 2,202,540 | Stelter | May 28, 1940 |
| 2,256,681 | Livermon | Sept. 23, 1941 |